US012794986B1

(12) United States Patent
Kovary et al.

(10) Patent No.: US 12,794,986 B1
(45) Date of Patent: Nov. 10, 2026

(54) CONNECTION PACKING

(71) Applicant: Amazon Technologies, Inc., Seattle, WA (US)

(72) Inventors: Talor Kovary, Haifa (IL); Saleh Abd-Alhaleem, Kfar Manda (IL); Leah Shalev, London (GB); Hani Ayoub, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/477,135

(22) Filed: Sep. 28, 2023

(51) Int. Cl.
*H04L 67/141* (2022.01)
*H04L 67/142* (2022.01)
*H04L 69/24* (2022.01)

(52) U.S. Cl.
CPC .......... *H04L 67/141* (2013.01); *H04L 67/142* (2013.01); *H04L 69/24* (2013.01)

(58) Field of Classification Search
CPC ...... H04L 67/141; H04L 67/142; H04L 69/24
See application file for complete search history.

(56) References Cited

U.S. PATENT DOCUMENTS 6,298,422 B1 * 10/2001 Spilo .................... G06F 9/4843 711/158
8,645,556 B1 * 2/2014 Masters ............. H04L 67/1014 709/224
10,880,204 B1 * 12/2020 Shalev ................. H04L 47/365
11,405,324 B1 * 8/2022 Segal ....................... H04L 1/08
11,917,017 B1 * 2/2024 Priescu .................. H04L 47/62
2002/0080810 A1 * 6/2002 Casais ................ H04L 49/9084 370/428
2004/0044771 A1 * 3/2004 Allred ..................... H04L 63/02 709/227
2006/0133333 A1 * 6/2006 Alex ....................... H04W 8/24 370/338
2008/0310392 A1 * 12/2008 Dowling .................. H04L 9/40 370/349
2009/0217089 A1 * 8/2009 Crumley ............. G06F 11/1438 714/15
2011/0116375 A1 * 5/2011 Friedman ............ H04L 49/9073 370/235
2012/0023506 A1 * 1/2012 Maeckel ............. G06F 11/1441 709/227
2012/0158814 A1 * 6/2012 Sabiwalsky ............... G06F 9/54 709/201
2013/0163445 A1 * 6/2013 Majumdar .............. H04L 43/50 370/252
2017/0187629 A1 * 6/2017 Shalev ................ H04L 61/5007
(Continued)

*Primary Examiner* — Scott B Christensen
*Assistant Examiner* — Zonghua Du
(74) *Attorney, Agent, or Firm* — Weaver Austin Villeneuve & Sampson LLP

(57) ABSTRACT

A network connection is allocated an active memory slot for storing active connection information to maintain an active state of the network connection. When the network connection is idle, or not used frequently, the network connection can be transitioned to the inactive state by storing, in a packed memory slot that occupies less memory than the active memory slot, a current state of the network connection. When the network connection is to be restored to the active state, the network connection can be activated by moving the current state of the network connection from the packed memory slot into a free active memory slot.

20 Claims, 8 Drawing Sheets

(56) References Cited

U.S. PATENT DOCUMENTS

| | | | | |
|---|---|---|---|---|
| 2019/0253351 | A1* | 8/2019 | Ihlar | G06F 13/00 |
| 2024/0045800 | A1* | 2/2024 | Agarwal | G06F 12/123 |
| 2024/0188175 | A1* | 6/2024 | Liu | H04W 76/27 |
| 2025/0080616 | A1* | 3/2025 | Urman | H04L 67/143 |

* cited by examiner

CONNECTION PACKING

BACKGROUND

Computing networks can be implemented as packet-switched networks that include devices such as servers that manage workloads and respond to client requests, switches that connect devices together, routers that perform packet forwarding functions, etc. The devices may communicate over a local area network (LAN) using transport protocols such as Transmission Control Protocol (TCP), User Datagram Protocol (UDP), or Scalable Reliable Datagram (SRD) transport protocol. Generally, a protocol handshake may be performed between the client and the server to establish a network connection for transmitting or receiving packets over the network.

BRIEF DESCRIPTION OF THE DRAWINGS

Various embodiments in accordance with the present disclosure will be described with reference to the drawings, in which.

DETAILED DESCRIPTION

Figure 1:
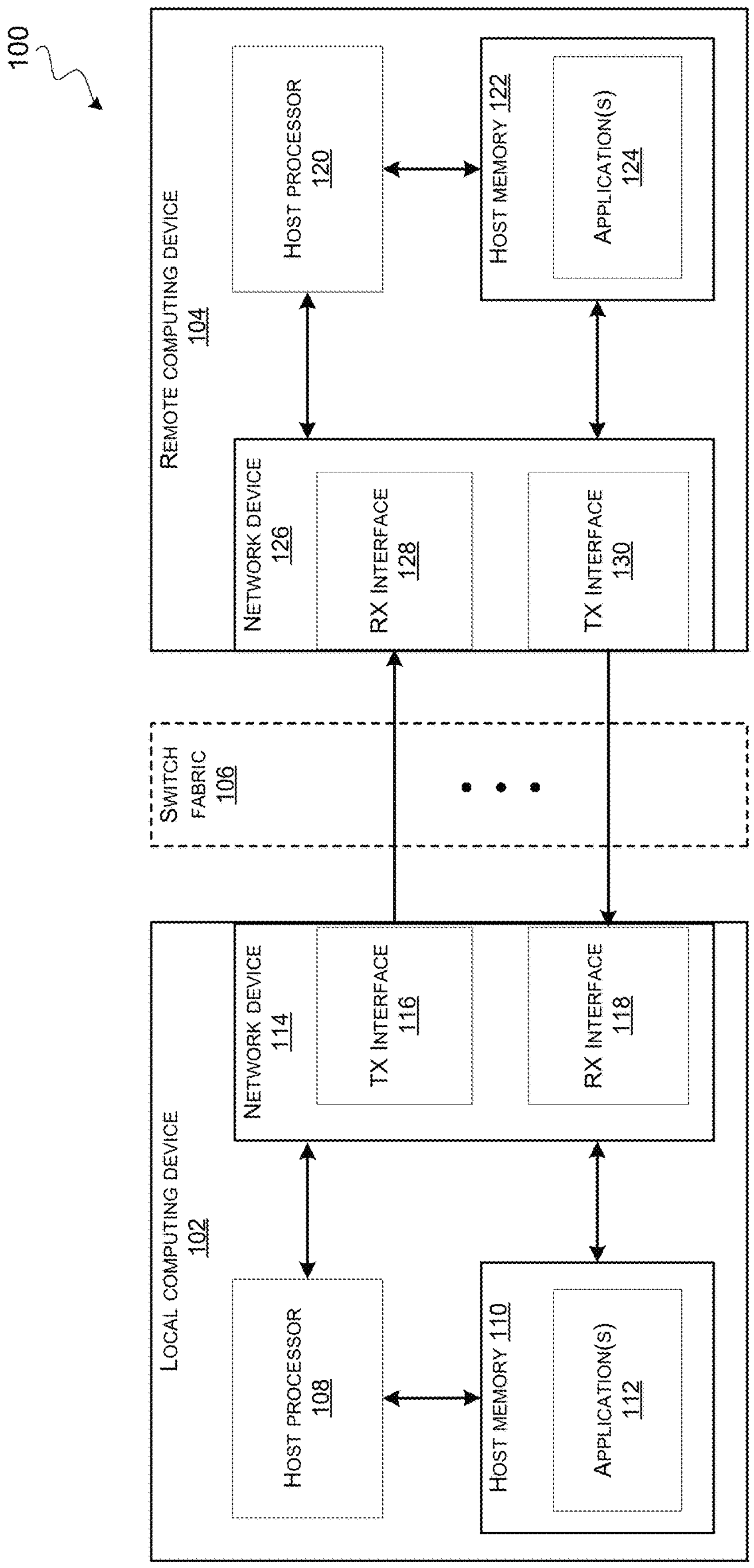
FIG. 1 illustrates an example of a computing system comprising two computing devices configured to exchange traffic over a network using a respective network device.

Transport layer protocols, such as, Scalable Reliable Datagram (SRD), can allow creating network connections between devices on the network. SRD can enable the use of multiple paths to send packets of the same user flow in parallel over the network from a source device to a destination device, which can reduce overall latency and improve reliability. Thus, if problems are seen (e.g., congestion on a particular path), paths can be quickly switched, and the packets may be retransmitted over a different path. The SRD transport protocol may also be referred to as the Relaxed Reliable Datagram (RRD) transport protocol.

In some implementations, a flow of packets from a source device to a destination device may be divided into groups of packets, which may be referred to as "flowlets". The number of flowlets between the source device and the destination device may be configurable, and/or may be limited only by the number of available paths between the two devices. Each flowlet may maintain a packet serial number (PSN), and as packets from the flow are assigned to a flowlet, each packet may also be assigned a next PSN for that flowlet. Each flowlet may take a different path, with all packets in one flowlet using the same path. Packets may also be assigned a flowlet identifier (ID), which may be used by the destination device to identify each packet's flowlet and path.

In most cases, a local device that wants to transmit packets to a remote device may initiate a handshake with the remote device to establish a network connection based on a transport layer protocol. During the handshake, the local device may identify the source and the destination, and negotiate initial parameters of the network connection. For example, the initial parameters may include a maximum number of flowlets (e.g., channels or paths) allocated to the network connection with the remote device, an epoch identifying a current session, and initial PSNs associated with respective flowlets. Once a network connection is established, the local device can send a packet to the remote device comprising a corresponding flowlet ID and the PSN, and get an acknowledgement (ack) back from the remote device that includes the same flowlet ID and the PSN to identify the packet that was received. Multiple such network connections can be established between the local device and the remote device to transfer packets associated with different applications executing on the local device and the remote device.

Generally, each network connection may be allocated a memory slot to store active connection information that may be used to maintain an active state of the network connection. For example, in the active state, the network connection may be used for transmission and retransmission of packets (in case of timeouts due to dropped packets) using different flowlets and corresponding PSNs. In some implementations, the active connection information stored in the active memory slot may include information to track the states of the packets handled by the network connection. For example, the states of the packets may include PSNs corresponding to the packets for each flowlet used by the network connection. The PSNs can be used to identify the dropped packets, and/or re-order the packets if the packets received by the destination device are out-of-order. The active connection information stored in the active memory slot may also include network connection statistics, which can be used for debugging purposes and/or to maintain congestion control history. Some examples of the network connection statistics may include number of packets transmitted on each flowlet, number of acks received, round-trip time of packets, inflight packets, etc.

Thus, most of the memory space in the active memory slot allocated to the network connection is used for functional purposes when the network connection is in the active state, e.g., have incoming or outgoing packets to handle. However, in most cases, not all the network connections are active at the same time. For example, if there is enough memory to occupy 100 memory slots for active network connections, about half of the network connections may be active at the same time, and the remaining network connections may be idle. In such cases, the idle network connections may still be allocated the full memory slot even though there are no packets to handle on the particular connection. Thus, the number of network connections available to each user may be limited based on the memory constraints and/or other hardware resources associated with the network connections.

Techniques described herein can be used to allow the user to have access to a higher number of network connections by transitioning some of the network connections into inactive state, and making the active memory slots that were occupied by those network connections available to the user for other connections. A network connection that is idle or used infrequently can be transitioned to the inactive state by copying only some of the information from the active memory slot to a packed memory slot that occupies less memory than the active memory slot. The information being copied may include relevant information needed to restore the network connection back to the active state. Such relevant information may include a current state of the network connection. The current state of the network connection may include the epoch, a respective flowlet ID for each flowlet used by the network connection, and the current PSNs corresponding to each flowlet used by the network connection. When the network connection needs to be restored to the active state for transmitting or receiving packets again, the current state of the network connection can be moved from the packed memory slot into a free active memory slot. Note that the current state of the network connection may represent the most recent state of the network connection in the active state before transitioning to the inactive state.

In some embodiments, a pool of free active memory slots can be maintained for new network connections. A new network connection may refer to a connection that has not yet been established, or to a previously inactivated connection that is being reactivated. When a number of free active memory slots in the pool goes below a threshold value, one or more idle network connections can be selected for proactively transitioning to an inactive state. In some embodiments, when a new network connection needs to be established or activated, and there are no free active memory slots are available, a least-recently-used network connection can be selected for transition to the inactive state to free-up the occupied active memory slot for the new network connection. In some cases, if the least-recently-used network connection slot is still actively handling packets, a minimal handshake may need to be performed to quiesce the memory slot first by clearing any incoming or outgoing packets.

Thus, by saving only minimum information that is used for restoring the network connections from the inactive state, an overall count of the network connections available to the user can be increased. As an example, if a packed memory slot uses 20% of memory as compared to an active memory slot, a memory that can support 100 active memory slots, can be modified to support 50 active network connections and 250 inactive network connections for a total of 300 available network connections. The number of active and inactive connections can vary over time as needed. If the number of active connections increases, some of the packed memory slots can be reallocated to make room for additional active memory slots. In some implementations, the packed memory slots can also be offloaded to host memory to make room for additional active memory slots. The techniques described herein can also be used to increase available memory resources by freeing up the active memory slot allocated to the selected network connection. The memory resources can be used for other tasks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computing system 100 comprising two computing devices configured to exchange traffic over a network using respective network devices.

As an example, the computing system 100 may comprise a local computing device 102 and a remote computing device 104 configured to exchange traffic via a switch fabric 106. Although only one remote computing device is shown, the local computing device 102 can communicate with multiple remote computing devices. Each of the local computing device 102 and the remote computing device 104 may include computers, servers, or processing nodes, which may operate as a source device or a destination device at different times of operation. The local computing device 102 and the remote computing device 104 may be implemented using any suitable integrated circuits, e.g., system-on-chips (SoCs), field programmable gate arrays (FPGAs), or application specific integrated circuits (ASICs).

The local computing device 102 may include a host processor 108, a host memory 110, and a network device 114, and the remote computing device 104 may include a host processor 120, a host memory 122, and a network device 126. The network device 114 may include a transmitter (TX) interface 116 and a receiver (RX) interface 118, and the network device 126 may include a RX interface 128 and an TX interface 130. The host processor 108 and the host processor 120 may be configured to execute respective application(s) 112 and application(s) 124 based on the functionality supported by the computing system 100. For example, one or more of the applications 112 may transmit packets to, or receive packets from, one or more of the applications 124, or vice-versa. As an example, the application 112 can be a client application that has data to transmit to a server application 124.

The network device 114 and the network device 126 may be operable to provide a network interface to the applications 112 and 124 for transmitting and receiving packets via their respective TX and RX interfaces. The switch fabric 106 may include one or more of routing circuits, switches, interconnects, and/or other suitable circuitry to facilitate transfer of packets between the local computing device 102 and the remote computing device 104 via different network connections or paths based on a transport layer protocol. As an example, the transport layer protocol can be a Scalable Reliable Datagram (SRD) transport protocol, which can allow use of multiple paths to send packets of the same or different user flows in parallel over the network. Using multiple paths in parallel can enable the spreading of packets of a given flow onto different paths to reduce overall latency and improve reliability. Thus, if problems are seen (e.g., congestion on a particular path), paths can be quickly switched, and the packets may be retransmitted over a different path. Recovery from failed network equipment can happen quickly and does not depend on routing changes.

Generally, a source device that wants to exchange traffic (e.g., data or control packets) with a destination device on the network has to initiate a protocol handshake with the destination device to negotiate the initial parameters of the network connection to be established between the two devices. For example, the network device 114 may initiate a protocol handshake with the network device 126 to establish the network connection for transmitting and receiving packets via the TX interface 116 and the RX interface 118, respectively. Similarly, the network device 126 may initiate a protocol handshake with the network device 114 to establish the network connection (if one has not been established by network device 114) for transmitting and receiving packets via the TX interface 130 and the RX interface 128, respectively.

In a computer network, there may be multiple paths that the packets can take to travel across the network from a source device to a destination device. This is further described with reference to FIG. 2.

Figure 2:
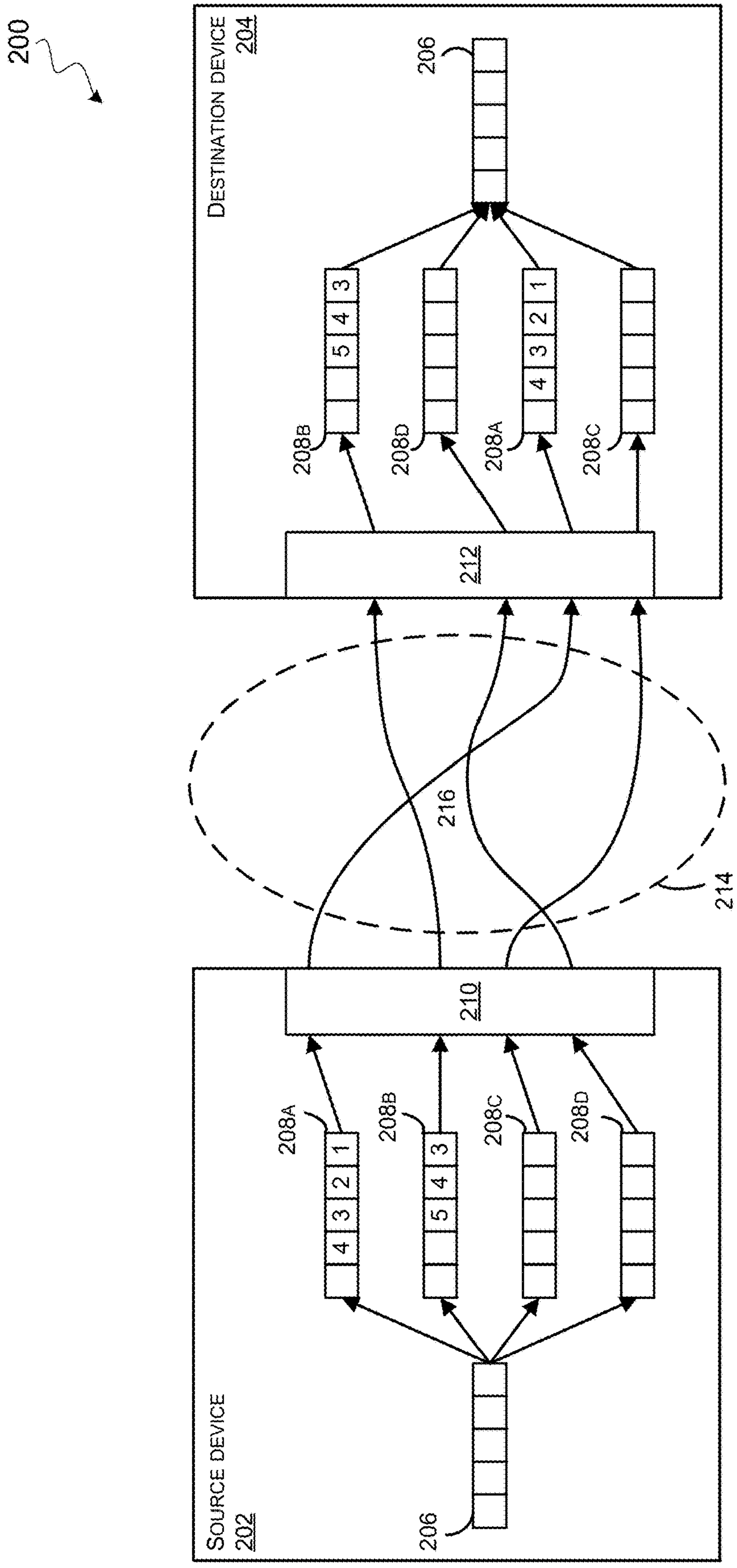
FIG. 2 is a diagram illustrating an example of multiple paths across a network that can be taken by a flow of packets.

FIG. 2 is a diagram 200 illustrating an example of multiple paths across a network that can be taken by a flow of packets.

As shown in FIG. 2, a source device 202 may be operable to transmit a flow of packets 206 to a destination device 204 via a network 214 based on a transport layer protocol, e.g., SRD protocol. For example, the source device 202 can be the network device 114 and the destination device 204 can be the network device 126. The flow of packets 206 may be associated with one or more applications 112 executing on the local computing device 102. The flow of packets 206 may be divided into groups of packets, also called flowlets. The number of flowlets allocated to a network connection between the source device 202 and the destination device 204 may be configurable, and/or may be limited only by the number of available paths 216 between the two devices 202, 204. FIG. 2 shows four flowlets 208*a*, 208*b*, 208*c*, and 208*d* allocated to the network connection, each flowlet comprising a group of packets. The flowlets 208*a*-208*d* may be sent on the network 214 via one or more ports 210 and received by the destination device 204 via one or more ports 212. Each flowlet may be transmitted over a different path 216 across the network 214, with all packets in one flowlet using the same path. The SRD protocol may manage multiple paths 216 across the network 214 to achieve greater utilization across available paths 216. In some implementations, a maximum number of flowlets allocated to the network connection between the source device 202 and the destination device 204 may be configured at the time of establishing the network connection. Each flowlet may be assigned a respective flowlet ID to identify the flowlet used by the network connection.

In most cases, packets from various sources may be placed into the same flow 206 when they are addressed to the same destination device 204. The source device 202 may track the packets on a per flowlet basis. Each flowlet may maintain a packet serial number (PSN), which can be used to track an order of transmission for the packets. In some implementations, an initial PSN may be negotiated between the source device 202 and the destination device 204 for each flowlet to indicate the start of that flowlet. As packets from the flow 206 are assigned to a flowlet, each packet may also be assigned a next PSN for that flowlet. Each packet may also be assigned a corresponding flowlet ID, which may be used by the destination device 204 to identify each packet's flowlet and path. As an example, the flowlet 208*a* may include the packets with the PSNs of 1, 2, 3, 4, and so on, with 1 being the initial PSN for the flowlet 208*a*. Similarly, the flowlet 208*b* may include the packets with the PSNs of 3, 4, 5, and so on, with 3 being the initial PSN for the flowlet 208*b*. The flowlets 208*c* and 208*d* may also include the packets with the corresponding PSNs, which are not shown in FIG. 2.

In some embodiments, each network connection for a device may be assigned an active memory slot for storing active connection information to maintain an active state of the network connection. The active connection information stored in the active memory slot may include PSN tracking information for each flowlet used by the network connection. The PSN tracking information may include information to track the states of the packets handled by the network connection for each flowlet. For example, the PSNs can be used to identify the dropped packets, and/or re-order the packets if the packets received by the destination device are out-of-order. The destination device 204 may also track the states of the received packets using PSNs for each flowlet. The destination device 204 may use this information to generate acks that are transmitted to the source device 202. For example, each ack may include a PSN corresponding to the received packet, and the flowlet ID to indicate to the source device 202 that the packet for a particular flow has arrived. Using the PSN tracking information, the source and destination devices 202, 204 may ensure that every packet in the flow reaches the destination device 204.

As shown in FIG. 2, the destination device 204 may receive the flowlets 208*a*, 208*b*, 208*c*, and 208*d* via different paths 216 across the network 214 that may be combined to recover the flow of packets 206. Note that FIG. 2 shows the packets belonging to the flowlets 208*a* and 208*b* arriving at the destination device 204 in the same order as they were transmitted. However, it should be noted that the packets may arrive out-of-order, and can be reordered by the destination device 204 based on the PSNs for the corresponding flowlet. For example, in some cases, the packets may arrive in out-of-order if a packet is dropped, and needs to be retransmitted. In such cases, the PSN tracking information can be used by the source device 204 to retransmit the packets.

In some implementations, the source and destination devices 202, 204 may also collect network connection statistics that can be used for debugging, to maintain congestion control history, or to improve performance. Some examples of the network connection statistics may include number of packets per flowlet transmitted over a period of time, rate of acknowledgements, count of dropped packets, round-trip time of packets, packets inflight, etc.

As an example, the statistics may be used to determine if certain paths are taking longer, which can be used to perform congestion control by routing the incoming packets to faster paths. In some implementations, performing the congestion control may also include exchanging messages with the remote device. The congestion control history may include a log of congestion control performed by the network device, e.g., changes in the paths or transmission rates, exchanging messages with the remote device, etc., which may become irrelevant if the network connection becomes idle for an extended duration.

When there are a large number of network connections occupying corresponding active memory slots, the number of free active memory slots available to the user may be limited. However, in most cases, some of those network connections may be idle (e.g., not handling packets), or may be used infrequently. The techniques described herein can be used to make a higher number of free active memory slots available to the user by transitioning some of the network connections that are occupying those active memory slots to an inactive state. In some embodiments, transitioning the network connection to the inactive state is performed by copying a current state of the network connection from the active memory slot to a packed memory slot that occupies less memory than the active memory slot. This is further described with reference to FIGS. 3A-3E.

Figures 3A, 3B, 3C:
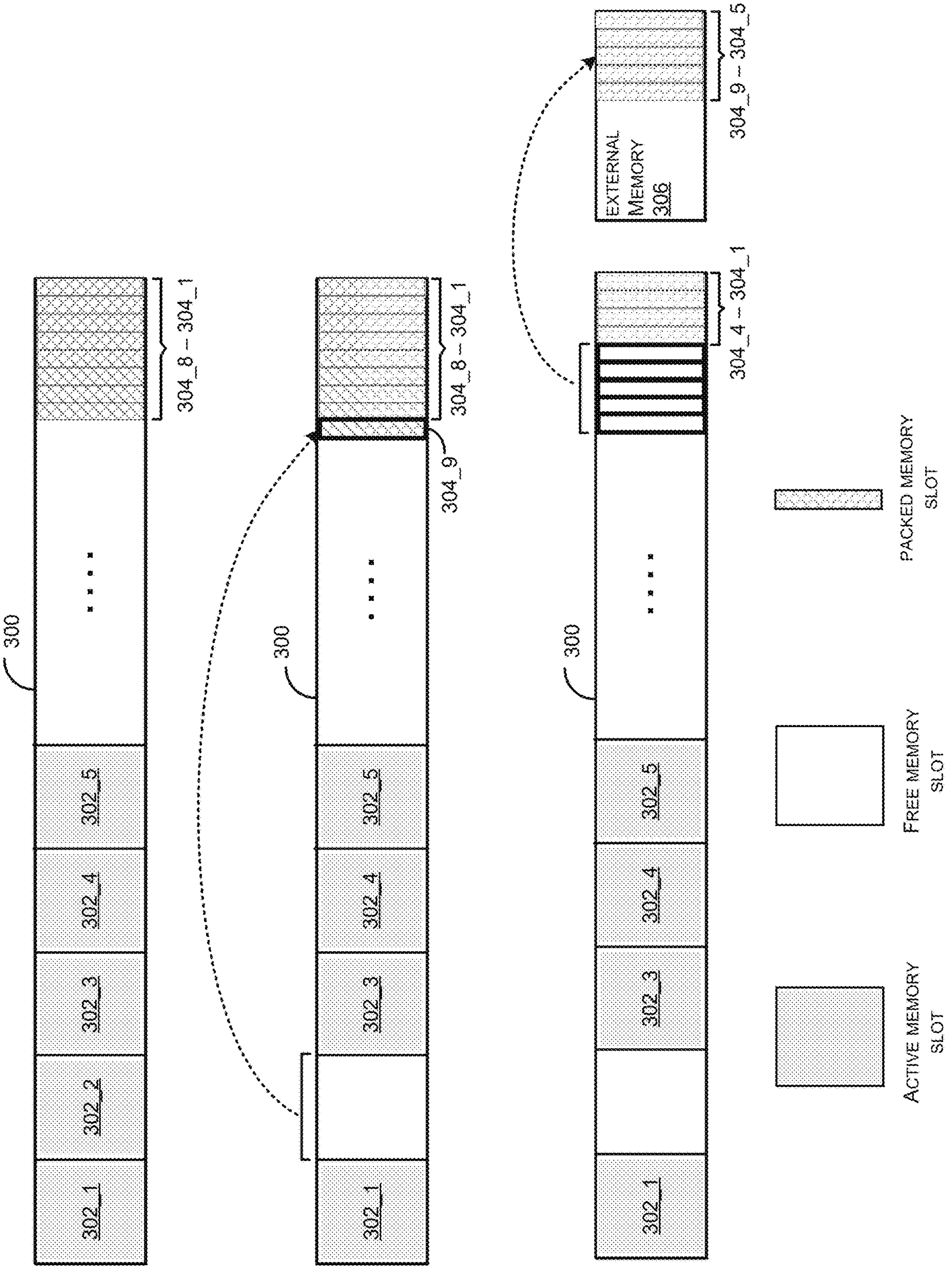
FIG. 3A illustrates an example of a memory configured to store a plurality of active memory slots and packed memory slots, according to some embodiments.
FIG. 3B illustrates an example of transitioning a network connection to the inactive state, according to some embodiments.
FIG. 3C illustrates an example of moving a set of packed memory slots into an external memory, according to some embodiments.

FIG. 3A illustrates an example of a memory 300 configured to store a plurality of active memory slots and packed memory slots, according to some embodiments. The memory 300 can be part of the memory for the network device 114 or the network device 126.

The plurality of active memory slots may include active memory slots 302_1, 302_2, 302_3, 302_4, and 302_5. The plurality of packed memory slots may include packed memory slots 304_1, 304_2, 304_3, 304_4, 304_5, 304_6, 304_7, and 304_8. Each of the active memory slots 302_1-302_5 may be allocated to store active connection information to maintain an active state of a corresponding network connection such as the network connection between the local computing device 102 and the remote computing device 104. Each of the packed memory slots 304_1-304_8 may be allocated to store a current state of a corresponding network connection that has been transitioned into an inactive state. Each of the packed memory slots 304_1-304_8 may occupy less memory than any of active memory slots in the memory 300.

FIG. 3B illustrates an example of transitioning a network connection to the inactive state, according to some embodiments.

As shown in FIG. 3B, a network connection that has been occupying the active memory slot 302_2 in the memory 300 in FIG. 3A can be transitioned to the inactive state by copying minimal information associated with the network connection into a packed memory slot 304_9 in the memory 300. The minimal information may include information needed to restore the network connection to the active state. Once the minimal information for the network connection has been copied into the packed memory slot 304_9, the active memory slot 302_2 becomes available to establish or activate a new network connection. The new network connection being activated can be a connection that has not yet been established, or a previously established connection that is being reactivated from the inactive state. When the network connection corresponding to packed memory slot 304_9 needs to be restored to the active state, the minimal information stored in the packet memory slot 304_9 can be moved into a free active memory slot in the memory 300.

In some examples, a network connection can transition into the inactive state when a number of free active memory slots that are available in the memory 300 to activate new network connections is below a threshold (e.g., 5, 10, 20, or some other number of free active memory slots), or when there are no free active memory slots available to activate a new network connection. The network connection being selected for transition to the inactive state can be, for example, an idle connection that is currently not sending or receiving packets, or a least-recently-used network connection. In some cases, if the least-recently-used network connection has pending packets for transmission, the pending packets can be cleared before transitioning the network connection to the inactive state. For example, a minimal handshake may be performed with the destination device to indicate that the network connection may be transitioning to the inactive state so that any outstanding transactions can be completed.

In some cases, a set of packed memory slots can be freed-up by moving the information stored in the set of packed memory slots to an external memory (e.g., host memory that is external to the network device) to further allow the user access to a higher number of network connections, as described with reference to FIG. 3C.

FIG. 3C illustrates an example of moving a set of packed memory slots into an external memory 306 such as host memory, according to some embodiments.

As shown in FIG. 3C, information stored in the packed memory slots 304_9-304_5 can be moved to the external memory 306 to free-up the memory 300 to occupy additional network connections. In some examples, information stored in all the packed memory slots can be moved to the external memory 306. The external memory 306 can be part of the host memory, or another suitable memory accessible to the network device. When a network connection corresponding to one of the packed memory slots 304_9-304_5 needs to be restored, the information for that network connection can be moved from the external memory 306 into a free active memory slot in the memory 300.

Figure 3D:
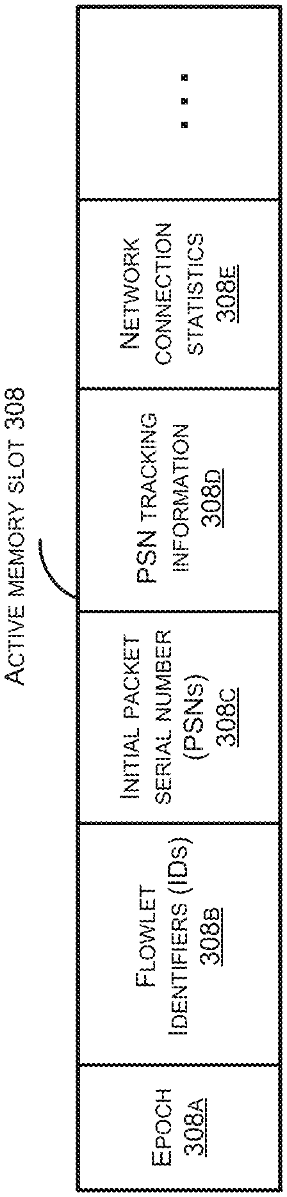
FIG. 3D illustrates an example of an active memory slot, according to some embodiments.

FIG. 3D illustrates an example of an active memory slot 308, according to some embodiments.

The active memory slot 308 can be an example of any of the active memory slots in the memory 300, e.g., the active memory slots 302_1-302_5. The active memory slot 308 can be allocated to a network connection for storing active connection information to maintain an active state of the network connection. The active connection information may include epoch **308*a*, flowlet IDs 308*b*, initial PSNs 308*c*, PSN tracking information 308*d*, network connection statistics 308*e***, and any other relevant information that may be needed to maintain the active state of the network connection.

Epoch **308*a* can be used to identify a session that was established between the source device and the destination device at the time of establishing the network connection. The flowlet IDs 308*b* may include a plurality of flowlet IDs identifying corresponding flowlets used by the network connection. As shown in FIG. 2, the flowlet IDs 308*b* may include a respective flowlet ID to identify each of the flowlets 208*a*, 208*b*, 208*c*, and 208*d*. The initial PSNs 308*c* may include the initial PSNs corresponding to each of the flowlets used by the network connection, as identified by the flowlet IDs 308*b***.

The PSN tracking information **308*d* may include tracking information for the PSNs corresponding to each flowlet used by the network connection. The PSN tracking information 308*d* may include, for example, a scoreboard to track the status of PSNs. On the TX side, the tracking information can indicate whether an ack has been received for a packet sent by the network device. Such information can be used to indicate whether a packet has been dropped, or the packet has to be retransmitted in case the ack was not received within a certain time period. On the RX side, the tracking information can indicate whether any packet has to be reordered, or if a request needs to be sent to a sender to resend a missing packet. The PSN tracking information 308*d*** may be maintained for a sliding window of most recent PSNs for each flowlet.

The network connection statistics **308*e* may include network metrics associated with each flowlet, e.g., number of packets transmitted in a certain time period (transmission rate of the packets), number of bytes sent, an ack rate of the packets, number of packets inflight, round-trip time of the packets, etc. The network connection statistics 308*e* can be used for debugging, to maintain congestion control history, and/or to improve performance. For example, the network connection statistics 308*e*** may be used to determine if a path is taking too long, or too many packets are being dropped on a certain path, so that the traffic can be rerouted.

Figure 3E:
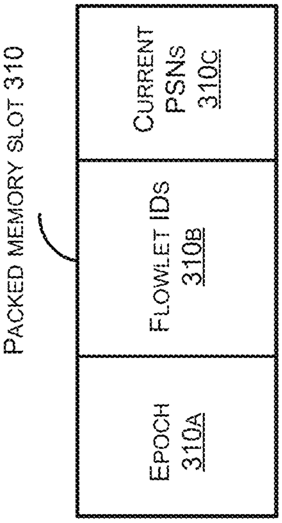
FIG. 3E illustrates an example of a packed memory slot, according to some embodiments.

FIG. 3E illustrates an example of a packed memory slot 310, according to some embodiments.

The packed memory slot 310 can be an example of any of the packed memory slots in the memory 300, e.g., the packed memory slots 304_1-304_9, and may occupy less memory in the memory 300 as compared to any of the active memory slots 302_1-302_5. The packed memory slot 310 may be used to store minimal information that may be needed to restore a network connection from an inactive state to an active state. For example, the packed memory slot 310 may include a current state of the network connection comprising an epoch 310*a*, flowlet IDs 310*b*, and current PSNs 310*c* for each flowlet.

Figure 4:
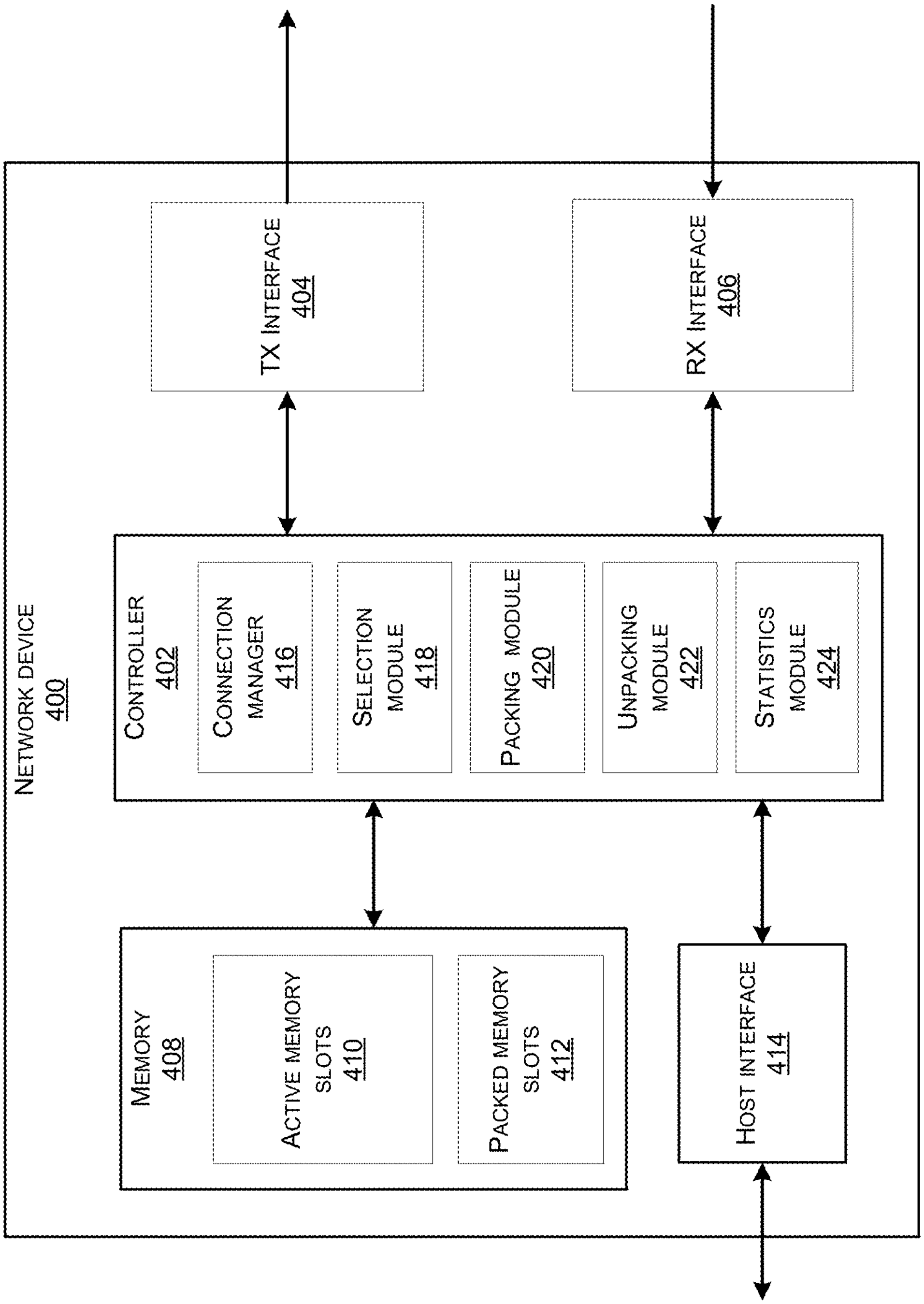
FIG. 4 illustrates an example of a block diagram of a network device, according to some embodiments.

FIG. 4 illustrates an example of a block diagram of a network device 400, according to some embodiments. The network device 400 can be an example of the network device 114, network device 126, source device 202, or the destination device 204.

The network device 400 may include a controller 402 coupled to a TX interface 404, an RX interface 406, a memory 408, and a host interface 414. In some implementations, the controller 402 may include a connection manager 416, a selection module 418, a packing module 420, an unpacking module 422, and a statistics module 424. The controller 402 can be implemented using a combination of software and hardware, e.g., processors, state machines, microcontrollers, etc. The memory 408 may include a plurality of active memory slots 410 and a plurality of packed memory slots 412. Each packed memory slot from the plurality of packed memory slots 412 may be smaller in size than any of the active memory slots from the plurality of active memory slots 410. As an example, a packed memory slot may occupy about 20% of memory space occupied by an active memory slot. The memory 408 may also be used to store other data associated with the network connections, e.g., thresholds, configuration values, etc. The TX interface 404 may be operable to transmit packets for different flowlets to a remote network device using a network connection. The TX interface 404 may include ports, buffers, queues, a media access control (MAC) transmitter, a physical layer (PHY) interface, and/or other suitable components to perform the intended functionality. For example, the TX interface 404 can be used to send the packets corresponding to the flowlets 208*a*-208*b* via the ports 210. Each packet may include a flowlet ID and a PSN to identify the packet and the path 216 taken by the packet via the network 214. In some examples, the TX interface 404 can be used to send the acknowledgements to the remote network device for the packets received by the network device 400 via the RX interface 406. Each acknowledgement may include the flowlet ID and the PSN identifying the packet that was received.

The RX interface 406 may be operable to receive packets for different flowlets from the remote network device using the network connection. The RX interface 406 may include ports, buffers, queues, a MAC receiver, a PHY interface, and/or other suitable components to perform the intended functionality. The RX interface 406 can be used to receive the acknowledgements from the remote network device for the packets transmitted by the network device 400 via the TX interface 404. In some examples, the RX interface 406 can be used to receive packets for corresponding flowlets transmitted by the remote network device.

The active memory slots 410 may include a plurality of active memory slots for allocating to active network connections. As an example, the active memory slots 410 may include the active memory slots 302_1-302_5 described with reference to FIGS. 3A-3D. Each active memory slot can be used for storing active connection information to maintain the active state of the corresponding network connection. For example, each of the active memory slots 410 may store the flowlet ID for each of the flowlets used by the corresponding network connection, the epoch, PSN tracking information for each flowlet, and the statistics collected for the corresponding network connection. An example of an active memory slot is shown in FIG. 3D. The active memory slots 410 may also include free or unoccupied slots that can be allocated to any new network connections being established or activated. This may include a connection that has not yet been established, or a previously inactivated connection that is being reactivated.

The packed memory slots 412 may include a plurality of packed memory slots, and each packed memory slot can be used to store the current state of corresponding network connection in the inactive state. The current state of the network connection may include the flowlet ID and the current PSN corresponding to each flowlet used by the network connection, and the epoch. An example of a packed memory slot is shown in FIG. 3E.

The host interface 414 may be configured to facilitate communication with the host device. As an example, the host interface 414 can be used to provide an interface with the applications executing on the host processor for configuration of the network connections and/or thresholds, setting up the direct memory access (DMA) transfers with the host memory, and for other suitable tasks. In some examples, the host interface 414 can be used to facilitate moving contents of the packed memory slots 304_9-304_5 to the host memory to free up the memory space occupied by those packed memory slots in the memory 408. The host interface 414 can also be used to facilitate moving contents of the packed memory slot (e.g., the last state of the network connection) that have been offloaded to the host memory into a free active memory slot in the active memory slots 410 to activate the network connection.

The connection manager 416 may be operable to establish network connections, and manage the states of each network connection. The connection manager 416 may initiate a handshake with a remote network device to establish a network connection with the remote network device based on a transport layer protocol, e.g., the SRD protocol. During the handshake, the connection manager 416 may identify the source and the destination, and negotiate initial parameters of the network connection. The initial parameters may include a maximum number of flowlets allocated to the network connection, an epoch identifying a current session, and initial PSNs associated with the respective flowlets. The initial PSNs may be used to indicate the start of the corresponding flowlets.

Once a network connection is established based on the initial parameters, the TX interface 404 can be used to send packets to the remote network device, and the RX interface 406 can be used to receive corresponding acks back from the remote network device. The connection manager 416 may also assign packets for each user flow to different flowlets, and next PSNs for each packet per flowlet. The connection manager 416 may also assign a corresponding flowlet ID to each packet, which can be used by the remote network device to identify each packet's flowlet and path. The connection manager 416 may also be operable to identify the packet for which an ack is received from the remote network device based on the flowlet ID and the PSN specified in the ack packet.

The connection manager 416 may also be operable to manage the states of each network connection by tracking the packets on a per flowlet basis. The states of the packets may include PSNs corresponding to the packets for each flowlet used by the network connection, which can be used to identify the dropped packets, and/or re-order the packets if the packets received by the destination device are out-of-order. For example, on the TX side, the connection manager 416 may track transmitted packets using the PSNs for each flowlet, and whether a corresponding ack for each packet sent by the network device 400 has been received. On the RX side, the connection manager 416 may track PSNs of received packets for each flowlet to determine if any packets arrived out-of-order. The connection manager 416 may store the PSN tracking information corresponding to each flowlet used by the network connection in an active memory slot allocated to the network connection in the active memory slots 410. In some examples, the PSN tracking information being maintained can be a sliding window of the most recent PSNs for each flowlet.

The selection module 418 may be operable to select a network connection that is occupying an active memory slot in the active memory slots 410 to transition to an inactive state. In some implementations, the selection module 418 may maintain a pool of free active memory slots in the active memory slots 410 that are available to activate new network connections. When the number of free active memory slot goes below a threshold, the selection module 418 may select an idle network connection that is currently not handling packets for transitioning to the inactive state. In some implementations, the selection module 418 may omit maintaining a pool of free active memory slots. In such implementations, when a new network connection is to be activated, and there are no free active memory slots available in the active memory slots 410, the selection module 418 may select a least-recently-used network connection as the network connection for transitioning to the inactive state. The new network connection can be a newly established network connection, or an already established network connection that is being restored from the inactive state. In some implementations, the selection module 418 may be operable to select a network connection to transition to the inactive state, which can be used to increase available memory resources for the user or for other tasks by freeing up the active memory slot allocated to that network connection.

In some cases, if the least-recently-used network connection is not in the idle state, the connection manager 416 may perform a minimal handshake with the remote network device to clear any pending transactions. For example, if the network device 400 has any pending packets for transmission, the connection manager 416 can clear the pending packets by sending those packets to the remote network device and after receiving the corresponding acks, can inform the remote network device about transitioning to the idle state. If the network device 400 is expecting any missing packets from the remote network device (e.g., if the PSNs of the received packets are not in order), the connection manager 416 may wait for those missing packets. Once the missing packets are received, the connection manager 416 can send the corresponding acks via the TX interface 404, and inform the remote network device to stop sending packets for transitioning to the inactivate state.

The packing module 420 may be operable to transition the selected network connection to the inactive state by storing minimum information in one of the packet memory slots 412 that may be needed to restore the network connection from the inactive state. In some implementations, the packing module 420 may store a current state of the network connection. For example, the packing module 420 may store the respective flowlet ID for each flowlet used by the network connection, the epoch, and the current PSNs corresponding to each flowlet used by the network connection.

The unpacking module 422 may be operable to determine when a network connection that has been transitioned to the inactive state is to be restored to the active state. For example, the application executing on the host device may have packets to transfer to the remote network device using the network connection, or the application executing on the remote network device may have packets to send to the network device 400 using the network connection. When the network connection is to be restored, the unpacking module 422 may activate the network connection by moving the current state of the network connection from the packed memory slot into a free active memory slot in the active memory slots 410. By reactivating the network connection in such a manner, the initial handshake and overhead that would otherwise be required to establish a new connection can be omitted. This may also allow the connection to come up faster than having to establish a new connection.

The statistics module 424 may be operable to collect statistics for each network connection by tracking various network metrics associated with the network connection, e.g., the transmission rate of the packets, ack rate of the packets, drop rate, round-trip time of the packets, inflight packets, etc. The statistics module 424 may store the statistics for each network connection in the active memory slot allocated to the network connection, e.g., in the network connection statistics 308*e* field in the active memory slot 308, as shown in FIG. 3D. The network connection statistics may be used for debugging and/or to maintain congestion control history, and may not be needed for restoring an inactive network connection.

Figure 5:
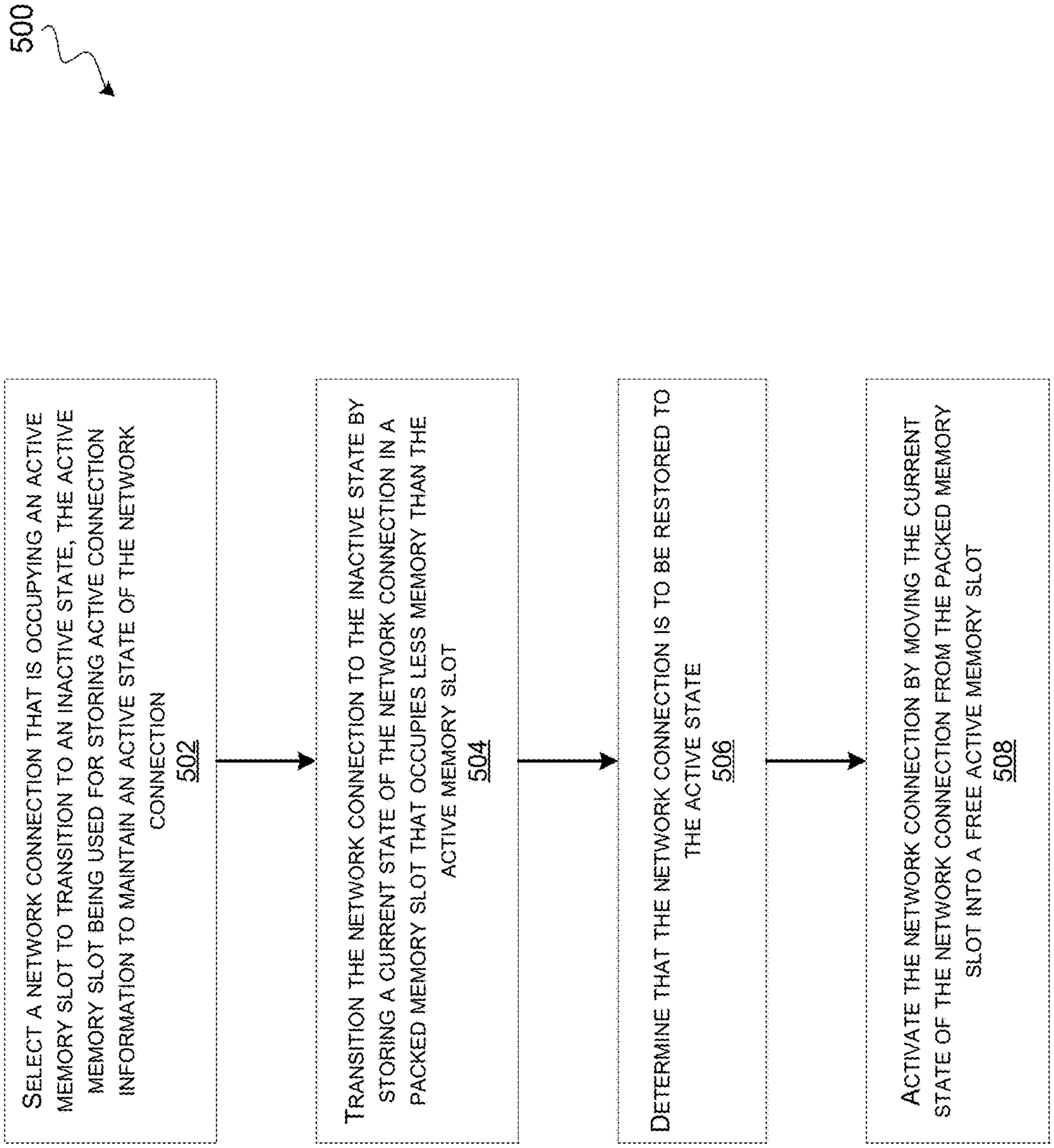
FIG. 5 illustrates an example of a flowchart for a method performed by a local integrated circuit device, according to some embodiments.

FIG. 5 illustrates an example of a flowchart 500 for a method performed by an integrated circuit device, according to some embodiments. The integrated circuit device can be, for example, the network device 400, network device 114, network device 126, source device 202, or the destination device 204.

In step 502, the method includes selecting a network connection that is occupying an active memory slot to transition to an inactive state. For example, the network connection may be occupying the active memory slot 302_2, as shown in FIG. 3A. The active memory slot 302_2 may be used for storing active connection information to maintain an active state of the network connection, as shown in FIG. 3D. The network connection may have been established by the connection manager 416 based on the initial parameters negotiated with the remote device for the network connection. The initial parameters may include a maximum number of flowlets allocated to the network connection, an epoch identifying a current session, and initial PSNs associated with the respective flowlets. As shown in FIG. 2, the network connection may use the flowlets 208*a* and 208*b*, with the respective initial PSNs being 1 and 3. As the packets from the flow are assigned to the flowlets 208*a* and 208*b*, the connection manager 416 may assign the next PSNs to the packets and track the acks for the PSNs to ensure that the packets have been received by the remote device, and do not need to be retransmitted. When the network connection is not handling any packets, the network connection may be in an idle state. The selection module 418 may select an idle network connection as the network connection when a number of free active memory slots available to activate new network connections is below a threshold, or a least-recently-used network connection as the network connection, when the local integrated circuit device has no free active memory slots available to activate a new network connection.

In step 504, the method includes transitioning the network connection to the inactive state by storing, in a packed memory slot that occupies less memory than the active memory slot, a current state of the network connection. The packing module 420 may transition the network connection into the inactive state by storing the respective flowlet ID for each flowlet used by the network connection, the epoch, and the current PSNs into a packed memory slot, as shown in FIG. 3E. For example, the packed memory slot can be the packed memory slot 304_9 in FIG. 3B.

In step 506, the method includes determining that the network connection is to be restored to the active state. The unpacking module 422 may determine that the network connection is to be restored to the active state when the network device 400 has any packets to transfer to the remote network device or is expecting to receive any packets from the remote network device.

In step 508, the method includes activating the network connection by moving the current state of the network connection from the packed memory slot into a free active memory slot. For example, the unpacking module 422 may activate the network connection by moving the flowlet IDs, the epoch, and the current PSNs from the packed memory slot 304_9 into a free active memory slot.

Thus, as described with reference to previous figures, when a network connection is idle, or not used frequently, the network connection can be transitioned to the inactive state by storing only minimum information that is required for restoring the network connection from the inactive state into a packed memory slot. This can allow the active memory slot that was storing the active state information for the network connection to be freed up, and an overall count of the network connections or memory resources available to the user can be increased.

Figure 6:
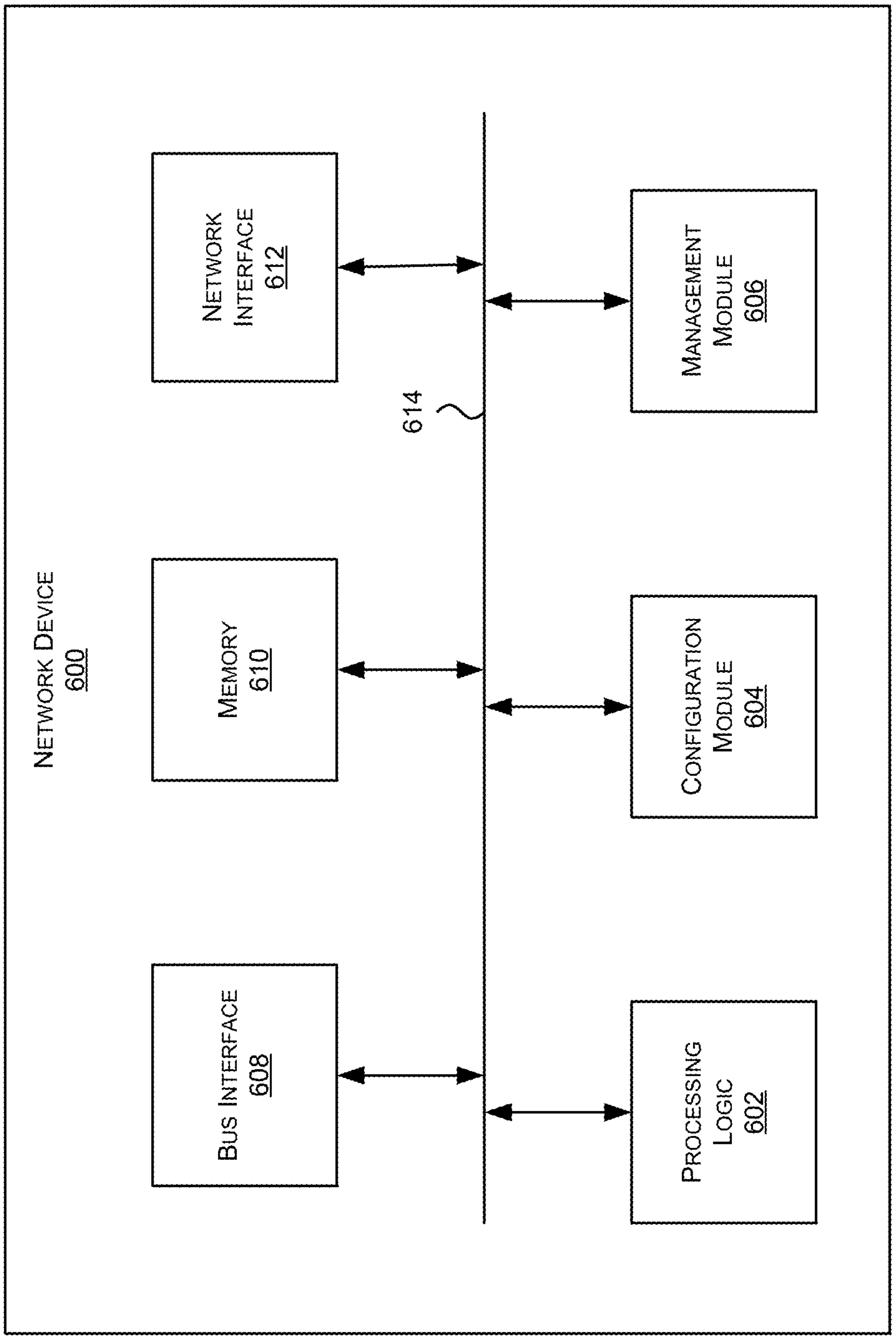
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. The network device 600 can be an example of the network device 400, network device 114, network device 126, source device 202, or the destination device 204. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 7. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc. The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
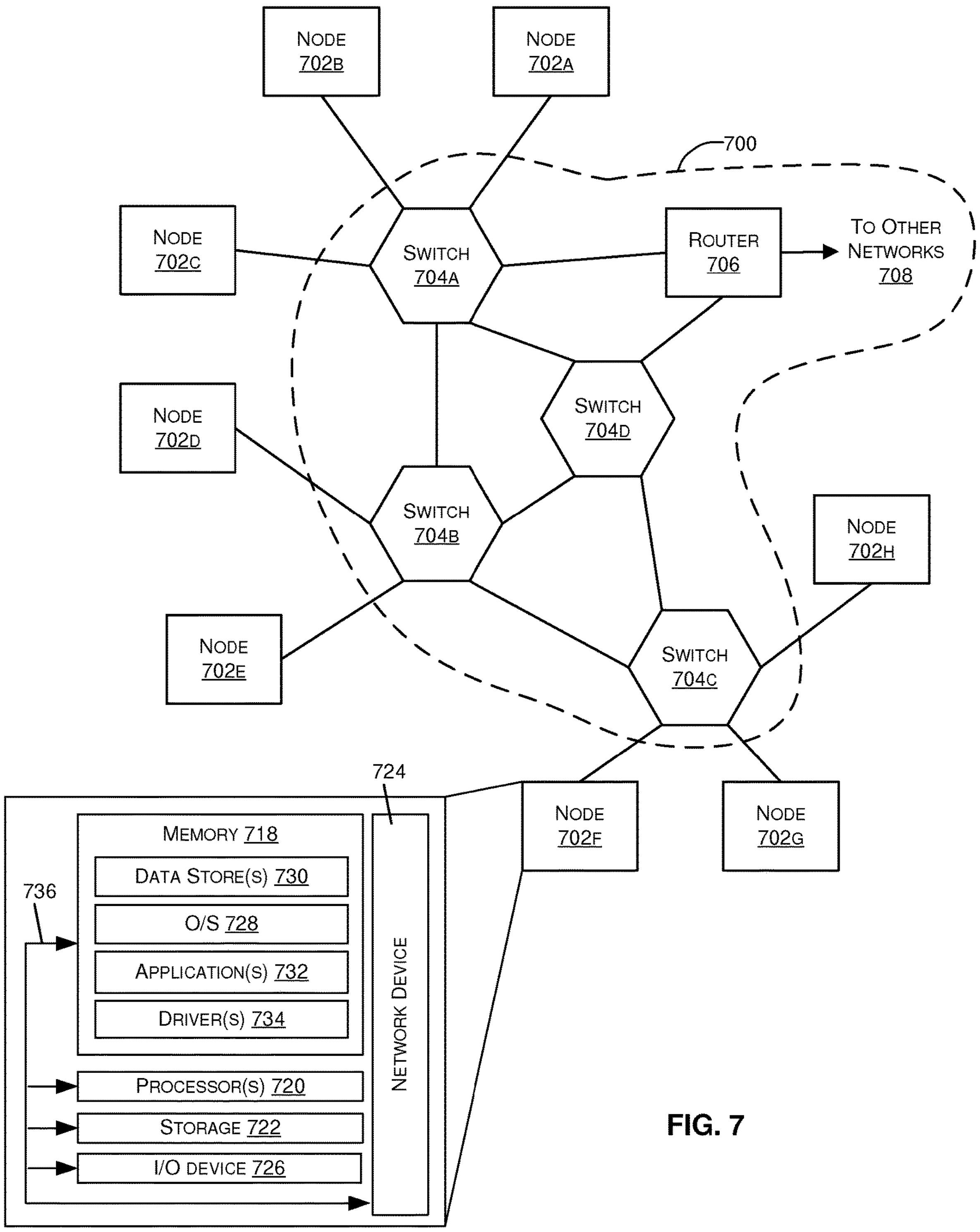
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704*a*-704*d*, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704*a*-704*d* may be connected to a plurality of nodes 702*a*-702*h* and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704*a*-704*d* and router 706, if present, may be referred to as a switch fabric, a fabric, a network fabric, or simply a network. In the context of a computer network, terms "fabric" and "network" may be used interchangeably herein.

Nodes 702*a*-702 h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702*a*-702 h may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702*a*-702*h*, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702*a*-702*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726.

Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702*a*-702*h* or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702*a*-702*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702*a*-702*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702*a*-702*h* may also include I/O device(s) 726, such as a keyboard, a mouse, a pen, a voice input device, a touch input device, a display, speakers, a printer, and the like. The node(s) 702*a*-702*h* may also include one or more communication channels 736. A communication channel 736 may provide a medium over which the various components of the node(s) 702*a*-702*h* can communicate. The communication channel or channels 736 may take the form of a bus, a ring, a switching fabric, or a network.

The node(s) 702*a*-702*h* may also contain network device(s) 724 that allow the node(s) 702*a*-702*h* to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method performed by a local network device, comprising:

initiating a handshake with a remote network device to negotiate initial parameters of a network connection with the remote network device based on a transport layer protocol, wherein the initial parameters include a maximum number of flowlets allocated to the network connection, an epoch identifying a current session, and initial packet serial numbers (PSNs) associated with respective flowlets;

establishing the network connection with the remote network device based on the initial parameters, wherein an active memory slot is allocated to the network connection for storing active connection information to maintain an active state of the network connection, wherein the active connection information includes a flowlet identifier (ID) for each flowlet used by the network connection, the epoch, PSN tracking information for each flowlet, and network connection statistics;

exchanging packets with the remote network device via the network connection using corresponding flowlets;

selecting the network connection to transition to an inactive state to free-up the active memory slot allocated to the network connection;

transitioning the network connection to the inactive state by storing, in a packed memory slot that occupies less memory than the active memory slot, a current state of the network connection comprising the epoch, a respective flowlet ID for each flowlet used by the network connection, and current PSNs corresponding to each flowlet used by the network connection;

determining that the network connection is to be restored to the active state when the local network device has packets to send to the remote network device; and activating the network connection by moving the current state of the network connection from the packed memory slot into a free active memory slot.

2. The method of claim 1, wherein the network connection is selected for transition to the inactive state when a number of free active memory slots available at the local network device to activate new network connections is below a threshold, and when the network connection is idle.

3. The method of claim 1, wherein the network connection is selected for transition to the inactive state when the local network device has no free active memory slots available to activate a new network connection, and when the network connection is a least-recently-used network connection at the local network device.

4. The method of claim 1, further comprising:

prior to activating the network connection, moving the current state of the network connection stored in the packed memory slot to a host memory to free up the memory occupied by the packed memory slot.

5. The method of claim 1, wherein a memory space occupied by the active memory slot is reallocated to a different task after transitioning the network connection to the inactive state.

6. The method of claim 1, wherein the network connection statistics are used for maintaining congestion control history.

7. The method of claim 1, wherein the transport layer protocol is a Scalable Reliable Datagram (SRD) protocol.

8. The method of claim 1, further comprising clearing pending packets on the selected network connection before transitioning the network connection to the inactive state.

9. The method of claim 8, wherein clearing the pending packets includes informing the remote network device that the selected network connection is being transitioned into the inactive state.

10. The method of claim 1, wherein the network connection statistics include packet round-trip time information or number of inflight packets information.

11. An integrated circuit device, comprising:

a memory comprising:

a first memory region allocated for active memory slots that are each configured to store active connection information to maintain an active network connection; and a second memory region allocated for packed memory slots that are each configured to store a current state of an inactive network connection, wherein each packed memory slot occupies less memory than an active memory slot; and a controller configured to:

initiate a handshake with a remote network device to negotiate initial parameters of a network connection with the remote network device based on a transport layer protocol, wherein the initial parameters include a maximum number of flowlets allocated to the network connection, an epoch identifying a current session, and initial packet serial numbers (PSNs) associated with respective flowlets;

establish the network connection with the remote network device based on the initial parameters, wherein an active memory slot is allocated to the network connection for storing active connection information to maintain an active state of the network connection, wherein the active connection information includes a flowlet identifier (ID) for each flowlet used by the network connection, the epoch, PSN tracking information for each flowlet, and network connection statistics;

exchange packets with the remote network device via the network connection using corresponding flowlets;

select the network connection that is occupying the active memory slot to transition to an inactive state to free-up the active memory slot;

transition the network connection to the inactive state by storing a current state of the network connection in a packed memory slot that occupies less memory than the active memory slot, the current state of the network connection comprising the epoch, a respective flowlet ID for each flowlet used by the network connection, and current PSNs corresponding to each flowlet used by the network connection;

determine that the network connection is to be restored to the active state when the controller has packets to send to the remote network device; and activate the network connection by moving the current state of the network connection from the packed memory slot into a free active memory slot.

12. The integrated circuit device of claim 11, wherein the controller is further configured to:

select an idle network connection as the network connection to transition to the inactive state when a number of free active memory slots available to activate new network connections is below a threshold.

13. The integrated circuit device of claim 11, wherein the controller is further configured to:

select a least-recently-used network connection as the network connection to transition to the inactive state, when the integrated circuit device has no free active memory slots available to activate a new network connection.

14. The integrated circuit device of claim 11, wherein the controller is further configured to:

offload the current state of the network connection stored in the packed memory slot to a host memory to free up the memory occupied by the packed memory slot.

15. The integrated circuit device of claim 11, wherein the network connection statistics are used for maintaining congestion control history.

16. The integrated circuit device of claim 11, wherein the controller is configured to clear pending packets on the selected network connection before transitioning the network connection to the inactive state.

17. The integrated circuit device of claim 11, wherein the controller is configured to inform the remote network device that the selected network connection is being transitioned into the inactive state.

18. The integrated circuit device of claim 11, wherein the network connection statistics include packet round-trip time information or number of inflight packets information.

19. A non-transitory computer readable medium storing program code that, when executed by a local network device, causes the local network device to perform operations including:

initiating a handshake with a remote network device to negotiate initial parameters of a network connection with the remote network device based on a transport layer protocol, wherein the initial parameters include a maximum number of flowlets allocated to the network connection, an epoch identifying a current session, and initial packet serial numbers (PSNs) associated with respective flowlets;

establishing the network connection with the remote network device based on the initial parameters, wherein an active memory slot is allocated to the network connection for storing active connection information to maintain an active state of the network connection, wherein the active connection information includes a flowlet identifier (ID) for each flowlet used by the network connection, the epoch, PSN tracking information for each flowlet, and network connection statistics;

exchanging packets with the remote network device via the network connection using corresponding flowlets;

selecting the network connection to transition to an inactive state to free-up the active memory slot allocated to the network connection;

transitioning the network connection to the inactive state by storing, in a packed memory slot that occupies less memory than the active memory slot, a current state of the network connection comprising the epoch, a respective flowlet ID for each flowlet used by the network connection, and current PSNs corresponding to each flowlet used by the network connection;

determining that the network connection is to be restored to the active state when the local network device has packets to send to the remote network device; and activating the network connection by moving the current state of the network connection from the packed memory slot into a free active memory slot.

20. The non-transitory computer readable medium of claim 19, wherein the operations further include maintaining a pool of free active memory slots for new network connections.

* * * * *